(No Model.)
W. G. AVERY.
STOVEPIPE.
No. 540,827. Patented June 11, 1895.
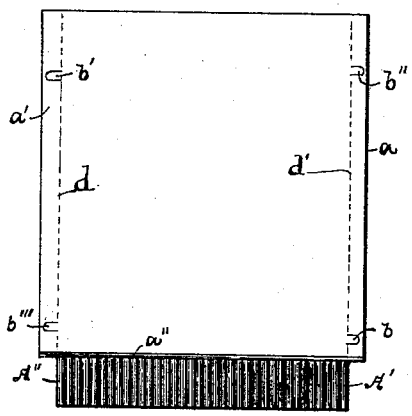
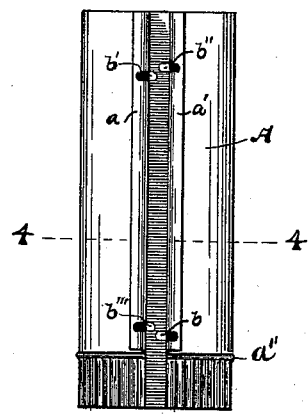
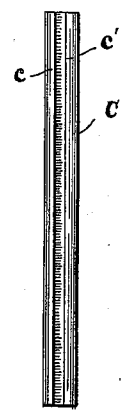
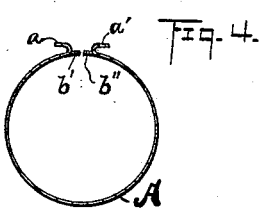
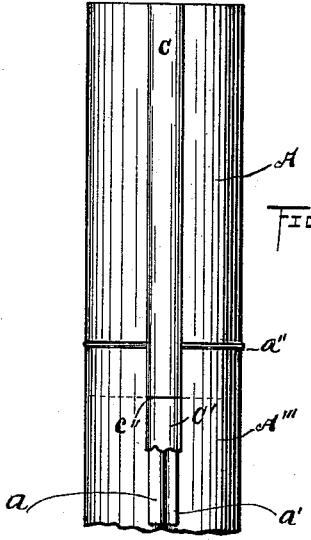
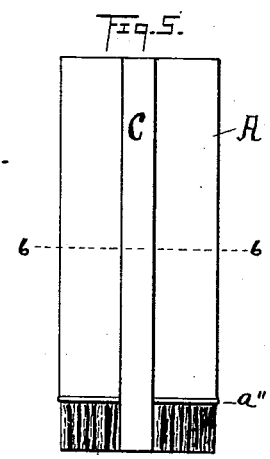
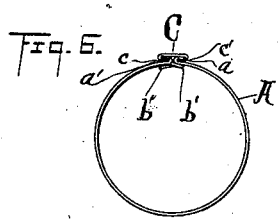
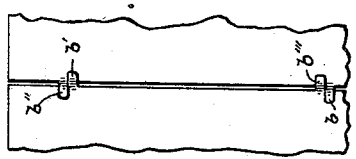
WITNESSES
Belle S. Lowrie.
E. E. Osborne
INVENTOR
William G. Avery,
by J. A. Osborne &Co.,
ATTORNEY.

UNITED STATES PATENT OFFICE.

WILLIAM G. AVERY, OF CLEVELAND, OHIO.

STOVEPIPE.

SPECIFICATION forming part of Letters Patent No. 540,827, dated June 11, 1895.

Application filed August 6, 1894. Serial No. 519,549. (No model.)

*To all whom it may concern:*

Be it known that I, WILLIAM G. AVERY, a citizen of the United States, residing at Cleveland, in the county of Cuyahoga, State of Ohio, have invented certain new and useful Improvements in Stovepipes, of which the following, with the accompanying drawings, is a specification.

The object of my invention is a construction of stove-pipe which is simple, and can be shipped in a knock-down condition and put together by the retailer or the user without difficulty.

My invention consists of a stove-pipe formed of a body-piece having outwardly and backwardly turned flanges, engaging lugs cut or stamped from the sheet metal forming the body-piece to prevent longitudinal movement of the meeting edges of the body-piece with reference to each other, and a clamp adapted to engage the outwardly and backwardly turned flanges of the body-piece to clamp together and to hold together the meeting edges of the body, as hereinafter described and claimed.

In the drawings, Figure 1 illustrates a blank from which the body of my improved stove-pipe is formed. Fig. 2 illustrates the body portion as it is formed ready to be shipped. Fig. 3 illustrates in elevation and end view the clamp that is employed to connect and fasten together the meeting edges of the body portion. Fig. 4 is a cross-section of Fig. 2 on the line 4 4. Fig. 5 illustrates a section of pipe ready for use, and Fig. 6 is a cross-section of Fig. 5 on the line 6 6. Fig. 7 illustrates the inside of the body along its meeting edges. Fig. 8 illustrates the union of two sections of pipe of my invention.

The body or cylindrical portion, A, of the pipe is formed of sheet metal such as is usually used in the manufacture of stove-pipes, and has portions as at A', A'' cut away from one of its ends so as to reduce the corrugated end of the completed pipe in diameter that it will pass into the end of the next length of pipe with which it may be jointed.

$a''$ is a bead which is formed upon the blank to limit the entrance of the end of the pipe into the length of pipe with which it is jointed.

$b, b', b''$ and $b'''$ represent tongues cut from the blank for the pipe for the purpose of forming engaging lugs. These lugs pass each other in the pipe when the pipe is set up, as illustrated by Fig. 7, and engage each other so as to prevent any longitudinal movement of one of the meeting edges of the body part A with reference to its opposite meeting edge. This makes the pipe very rigid when assembled. Outwardly and backwardly turned flanges $a$ and $a'$ are formed upon the meeting edges of the body portion A by bending upon the dotted lines $d, d'$, and a clamp, C, is adapted to inclose the flanges $a$ and $a'$ and clamp together the meeting edges of the body A. The clamp C consists of a piece of sheet metal with inwardly turned flanges $c$ and $c'$ which are adapted to pass under the flanges $a$ and $a'$ of the body A.

Fig. 8 illustrates two sections of pipe jointed by my invention. The clamp C passes up over the joint between the lengths of pipe A and A''' and incloses the outwardly and backwardly turned flanges of the two body portions, as described. As the clamp C passes over the joint formed by the meeting of the two lengths of pipe, the joint is "broken;" and the pipe, when so put together and connecting a stove with a chimney, is very firm and rigid, and saves it from any warping, bending, sagging, or twisting. $c''$ shows the meeting ends of the clamps C and C' of the jointed sections of pipe.

In shipping, several body pieces A of pipe are "nested" together in a rectangular crate, the clamps C being placed inside the inner "nested" body piece. By this method of shipping, many lengths of stove-pipe will occupy little more room than will a single joint of pipe of the old pattern.

What I claim as my invention, and desire to secure by Letters Patent, is—

As an article of manufacture, a stove-pipe consisting of a body-piece A, having outwardly and backwardly turned flanges $a$ and $a'$, and engaging lugs; and the clamp C adapted to inclose the flanges $a$ and $a'$ and clamp together the meeting edges of the body A, substantially as described.

In testimony whereof I affix my signature, in the presence of two witnesses, this 4th day of August, 1894.

WILLIAM G. AVERY.

Witnesses:
J. A. OSBORNE,
E. E. OSBORNE.